United States Patent [19]

Ruge

[11] 4,331,039
[45] May 25, 1982

[54] GEAR CHANGER
[75] Inventor: William G. Ruge, Phoenix, Ariz.
[73] Assignee: Sperry Corporation, New York, N.Y.
[21] Appl. No.: 135,814
[22] Filed: Mar. 31, 1980
[51] Int. Cl.³ .................... F16H 35/18; F16H 3/08
[52] U.S. Cl. .................... 74/10.41; 74/10.5; 74/10.8; 74/373
[58] Field of Search ............. 74/10.5, 373, 10.8, 74/216, 191, 10.41, 374, 375; 192/48.91, 96

[56] References Cited
U.S. PATENT DOCUMENTS

| | | | |
|---|---|---|---|
| 1,632,352 | 6/1927 | Stewart | 74/10.5 |
| 1,634,676 | 7/1927 | Meyer | 74/10.5 |
| 2,003,608 | 6/1935 | Roethel, Jr. | 74/10.8 |
| 2,033,825 | 3/1936 | Guest | 74/10.5 |
| 2,092,991 | 9/1937 | Spottel | 74/10.5 |
| 2,141,422 | 12/1938 | Thomas | 74/10.5 |
| 2,458,229 | 1/1949 | Vredenburg | 74/373 X |
| 2,732,550 | 1/1956 | Reedy | 73/178 R |
| 2,968,958 | 1/1961 | Kennedy et al. | 74/10.8 |
| 3,828,613 | 8/1974 | Sfreddo | 74/10.41 |
| 3,987,680 | 10/1976 | Naoi et al. | 74/10.41 |
| 4,043,206 | 8/1977 | Narihiro et al. | 74/10.41 |

FOREIGN PATENT DOCUMENTS

| | | | |
|---|---|---|---|
| 863374 | 1/1953 | Fed. Rep. of Germany | 74/108 |
| 635937 | 3/1928 | France | 74/10.5 |
| 796474 | 6/1958 | United Kingdom | 74/10.41 |

Primary Examiner—Leslie Braun
Attorney, Agent, or Firm—Howard P. Terry; Richard J. McGrath

[57] ABSTRACT

A fine/coarse data selector apparatus for aircraft flight control systems and instruments is manually adjustable in either an incremental fine mode or an uninterrupted slew mode by means of a high resolution gear change clutch means which eliminates any gear mesh alignment and resulting undesired signal transducer transients associated therewith.

5 Claims, 6 Drawing Figures

GEAR CHANGER

BACKGROUND OF THE INVENTION

1. Field of the Invention

The invention relates generally to automatic flight control apparatus having command data selectors which can be set by the pilot in either an incremental or slew mode, and more specifically, the invention relates to a high resolution gear changer for a manually operated multiple speed input data selector apparatus.

2. Description of the Prior Art

Modern commercial and military aircraft are generally equipped with automatic flight guidance control systems and flight guidance indicators which include command data selectors or transmitters which permit the pilot to manually select guidance data. In many cases these settings may be directly inputted to the control system in either an incremental or slew mode. For example, in a typical autopilot course select control, the data tranmitters include a course select synchro and a course select resolver. A typical course select synchro is disclosed in U.S. Pat. No. 2,732,550 for manually setting the course select pointer of a typical radio direction-indicating instrument. Another typical horizontal situation indicator is disclosed in U.S. Pat. No. 3,631,476, wherein the course select pointer is set from a remote selector thereby generating a course reference for an autopilot and/or flight director. The above U.S. Pat. No. 2,732,550 also discloses a course select resolver also positioned by the course selector for establishing the course reference for a VOR receiver. The course select synchro and the course select resolver, therefore, transmit data essential for setting a radio defined course for the aircraft and are conventional components in modern autopilots and flight display instruments. For convenient and efficient operation it is desirable, that the pilot be able to manually set simultaneously both the course select synchro and the course resolver in an incremental fashion for making small course changes and in a slew fashion for making larger changes.

Prior art attempts to provide the pilot with an apparatus that operates in an incremental and slew mode for setting both the course select synchro and the course select resolver have utilized gear shifting devices. These gear shifting devices are of a type having two driving gears mounted on a slidable and rotatable shaft that is spring loaded for maintaining the shaft in either a fine or coarse adjustment mode, i.e., an incremental or slew mode. Ordinarily, the shaft is disposed in a coarse adjustment mode wherein the first driving gear having a relatively large diameter engages a relatively small driven gear mounted on a second shaft. Thus, a rotation of the first shaft produces a relatively large rotation of the second shaft. When an axial force is applied to the first shaft, the first shaft is displaced inwardly disengaging the first relatively large driving gear from the relatively small driven gear. This inward displacement causes the second relatively small driving gear mounted on the first shaft to engage a second relatively large driven gear mounted on a third shaft. Thus a rotation of the first shaft in the fine adjustment mode produces a relatively small rotation of the third shaft. The rotation from the second and third shaft is coupled to the course select synchro and the course selected resolver in a manner well known in the art, thereby allowing both the synchro and the resolver to be set in either an incremental or a slew mode at the operator's discretion.

When utilizing the aforementioned prior art gear shifting technique to set the resolver and the synchro, undesired transients or glitches will occur if the gear teeth are not precisely aligned when the select knob is pressed or released. It is highly desirable that no sensor (synchro or resolver) movement occurs when changing from an incremental to slew mode or vice versa. Any gear movement is multiplied by the gear ratio difference at the sensor. This gear ratio difference is typically on the order of ten to one. Thus, changing from a fine adjustment mode to a course adjustment mode or vice versa will magnify these undesired effects. Since these devices, i.e., the course select synchro and the course select resolver ultimately control the aircraft through the autopilot, it is highly desirable to eliminate these transients or glitches altogether, otherwise the modern autopilot is so sensitive that it will respond to them. Therefore, there is a need to provide modern flight controls with a solution to the problems associated with conventionally changing the selector apparatus between an incremental mode and a slew mode such that smooth operation of the automatic flight control system may be provided during mode changes.

Another disadvantage of the prior art speed change mechanism, and one which is particularly annoying to the pilot, is the probability that when the selector knob is pressed, the gear teeth will not be properly aligned. The gear teeth may actually abut and prevent further knob movement and gear engagement, thus requiring the pilot to rotate the knob slightly in order to effect gear engagement. This problem has been reduced somewhat by shaping or tapering the tooth edges, but this is a very tedious, time consuming and hence very expensive technique. This technique, however, further aggravates the gear mesh transients discussed above.

SUMMARY OF THE INVENTION

According to the teachings of the present invention a high or substantially infinite resolution gear changer for a manually operated multiple speed data selector apparatus is provided. The manual input for the gear changer is provided by a clutching means comprised of an axially slidable and rotatable shaft coupled to a resilient puck having two adjoining and preferably identical conical surfaces. In the "normal" position or slew mode, the spring loaded clutching means couples a first or high speed gear train to the data selector apparatus for providing the data selector apparatus with a coarse or relatively high speed data select capability. The aforementioned coupling occurs as a result of the friction interface between a conical surface on the resilient puck which is moulded on the slidable shaft and which interfaces with a correspondingly shaped surface of a conical aperture in gear means coupled to the first or high speed gear train. When an axial force is applied to the clutching means to overcome the spring load, the resilient puck surface is disengaged from the first gear train and engages a correspondingly shaped surface of conical aperture of another gear means coupled to a second or low speed gear train. The second gear train provides a relatively fine or low speed data select capability to the data selector apparatus.

DESCRIPTION OF THE PREFERRED EMBODIMENT

For a more complete appreciation of the invention, attention is invited to the following description of an illustrative embodiment of the invention, as shown in the attached drawings.

Figure 2:
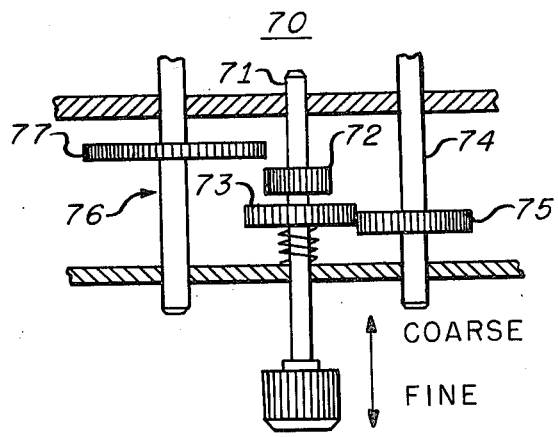
FIG. 2 is an illustration of a typical prior art speed change mechanism.
Figure 3:
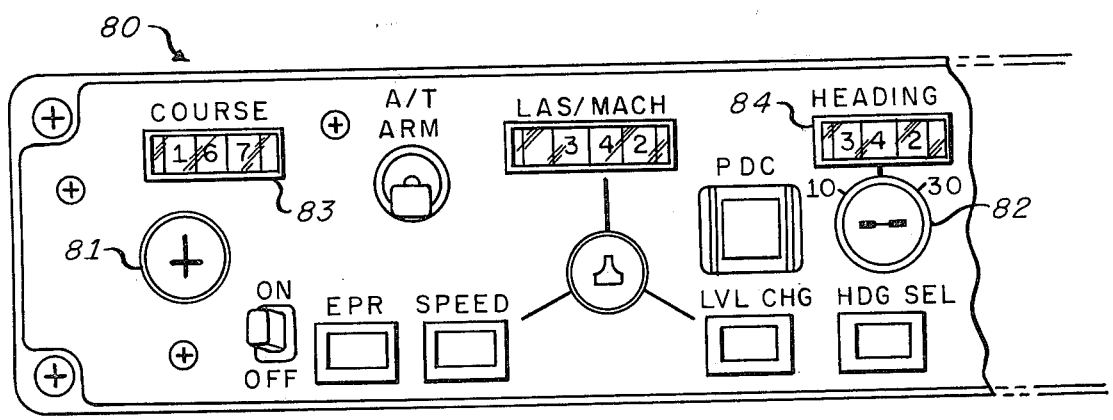
FIG. 3 partially illustrates a typical autopilot control panel within which the present invention may be utilized.

Referring first to FIG. 3, a portion of a typical manual or pilot's control panel of an aircraft automatic flight guidance and control or automatic pilot system is illustrated. Typical guidance parameters manually selectable by the pilot are craft magnetic heading and craft radio defined course, and the use of the parameters in the autopilot is illustrated typically in the present assignee's U.S. Pat. Nos. 3,007,656; 3,073,553; 3,079,109 and 3,386,689. In FIG. 3 the pilot selects these parameters by rotating knobs 82 and 81 respectively, and conventional counter displays 84, 83, respectively, display the value of the selected parameter. In many autopilot applications it is desirable to provide a two-speed select capability, a slow speed for selecting or commanding small changes in heading or course and a high speed for selecting large heading or course changes. Such capability is provided by some form of gear shifting mechanism between the knob and the heading or course synchro or resolver shafts. Typical of a prior art gear shifting mechanism is that shown in FIG. 2 wherein high and low speed spur gears 73 and 72, respectively, which may be provided with specially shaped or tapered teeth, which are very expensive, are selectively engaged with corresponding high and low speed output gears 75 and 77, respectively, by the axially movable shaft 71 on which the gear clusters 73 and 72 are mounted. Thus, for example, with knob 70 pulled out and rotated one complete revolution, the output shaft 74 (coupled with the signal generator—not shown) is rotated at a one-to-one ratio, i.e., high speed; whereas with knob 70 pushed in and rotated one complete revolution, the output shaft 76 is rotated at a one-to-ten ratio; i.e., low speed. The problem with this conventional gear shifter, which is overcome by the present invention, is that the gear teeth of gears 72 and 77 or 73 and 75 are not precisely aligned when the shift is commanded. This misalignment probably occurs most of the time, and the teeth may even abut one another thereby preventing continued axial movement of the knob to the aggravation of the pilot. Moreover, if their teeth are tapered to alleviate the abutment problem, and they are not precisely aligned, a slight rotation of the output shaft will result. This rotation in turn results in a movement of the signal generator which is particularly pronounced in the case of the high speed gear pass. In modern, highly sensitive autopilots and control surface servo actuators, this slight transient motion can result in an undesirable or bothersome surface and corresponding craft response. The present invention advantageously eliminates the above described undesired abutment and/or signal transient by eliminating completely any axial gear meshing, as will now be described.

Figure 1:
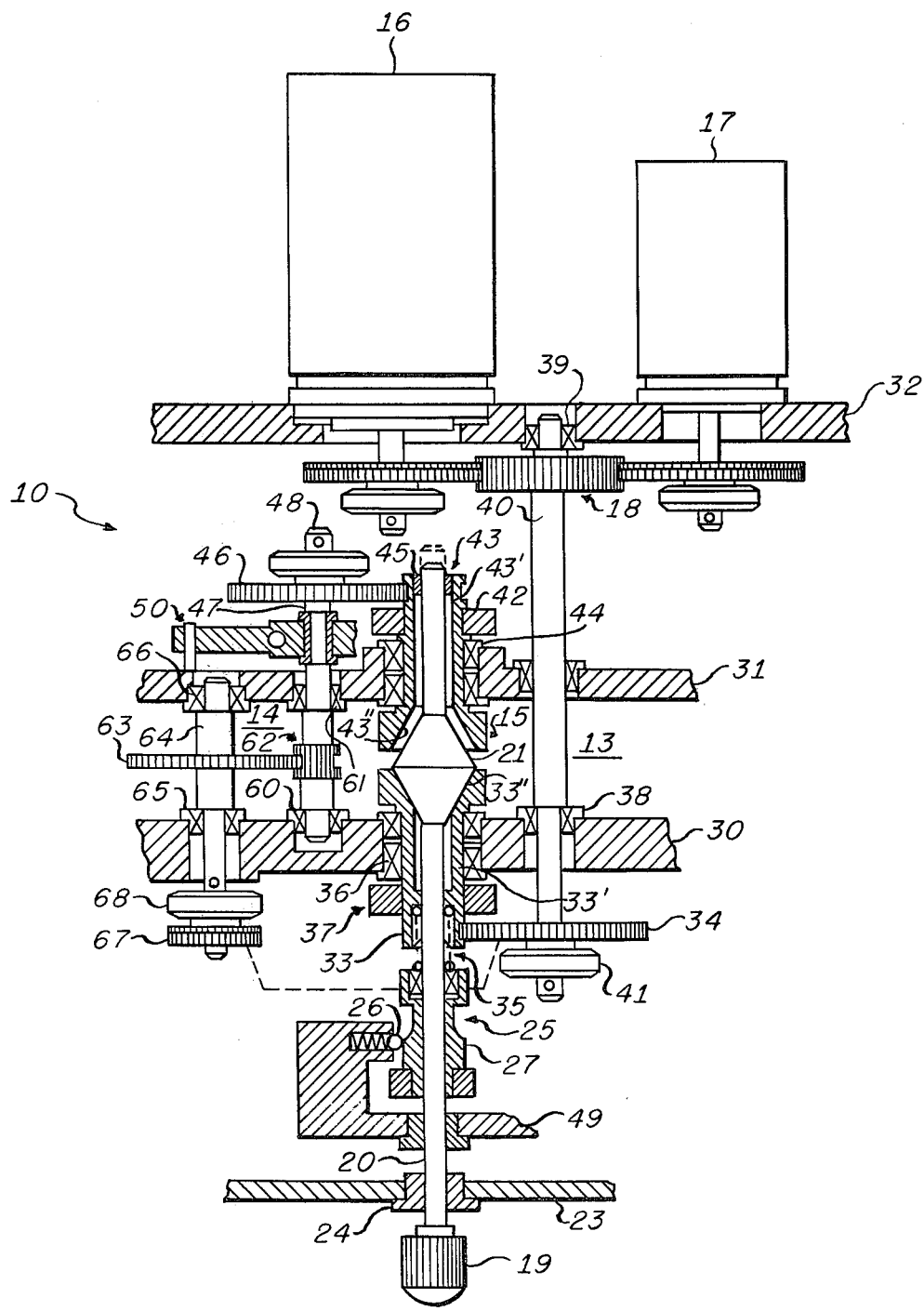
FIG. 1 is a schematic sectional of a gear changer having its gear trains and clutching means laid out so that their basic elements are all contained in the same horizontal plane for the purposes of clarity.

FIG. 1 illustrates a mechanical schematic view of a gear changer mechanism 10 having its multi-speed gear trains 13, 14 and its clutching means 15 and other elements laid out in a common plane for the purposes of clarity. In practice, the various elements of the mechanism need not, and probably would not, lie in the same plane, but they would be relatively disposed in accordance with the volumetric requirements of a particular application. The gear changer 10 is coupled to a course select resolver 16 and a course select synchro 17 via a suitable common, preferably one-to-one gearing means 18 in a manner well known in the art. The movable elements of the entire mechanism are supported in a fixed housing or framework having suitably spaced and apertured wall structures 30, 31, 32 and 49 and this housing is conventionally mounted in a control panel housing 23 with a selector knob 19 and a shaft 20 protruding therefrom.

The clutching means 15 is basically comprised of a slidable and rotatable shaft 20 having a resilient puck 21 fixed thereto and having two adjoining and preferably conical engagement surfaces, the conical configuration providing a substantially large radial surface area in a minimal axial length. The resilient puck 21 may preferably be a silicon rubber compound conventionally moulded onto the shaft 20. The shaft 20 includes the knob 19 that is suitable for turning by hand. The shaft 20 is journalled in housing walls 30, 31 and 49 and passes through the front panel of the autopilot control panel 23. A sealing bushing 24 may be provided. Also, a detent mechanism 25 which is hereinafter described in greater detail in FIG. 1B provides positive, incremental shaft rotation of the shaft 20 when the gear changer 10 is set in the low speed or fine select mode.

The synchro resolver 16 and synchro 17 are driven through a common gear 18 on a common shaft 40 journalled in suitable bearings 39, 38 in support walls 30 and 32, the other end of which terminates with common gear 34. The first or high gear train 13 includes a gear 34 in cooperation with a gear means 33 journalled in wall 30 which provides a coarse select capability of, for example, 3.6 knob 19 revolutions to rotate synchro/resolver rotors one revolution. The second or low speed gear train 14 includes gear 67, which meshes with common gear 34 (spaced therefrom in the FIG. 1 schematic, the mesh being indicated by a dotted line connection); gears 63, 62, and 46; and gear means 43. This gear pass provides a fine select capability of, for example, 36 revolutions of the knob 19 to rotate the synchro/resolver rotors one revolution. The gear means 33 and 43 are coupled with the selector shaft 20 and knob 19 through the clutch means 15 as will now be described. The gear means 33 has an elongated extension 33' that is drilled out along its axial length and permits the translation and rotation of the shaft 20 therein, and the gear extension 33' terminates with a flange portion having an internal conical bevel 33" matching one external conical surface of the resilient puck 21. Support member 30 includes an aperture for suitable dual ball bearings 36 wherein the gear 33 is journalled. The gear 33 is maintained in its relationship with the support member 30 by a conventional shaft clamp 37. The gear teeth of the gear 33 are aligned and mesh with the teeth of a gear 34 as described, which is secured to shaft 40 by clamp 41. The rotation of the shaft 40 is transmitted to the resolver 16 and synchro 17 via the common gear 18. The "normal" position of the puck 21 is determined by suitable spring means and may be either the fine or coarse position depending on the particular application. In the present embodiment a spring means 35 operable between shaft 20 and gear means 33 urges the shaft 20 and puck 21 into engagement with the conical surface 33" to establish the coarse mode as the "normal" mode.

The gear means 43 is similar in design to the gear 33, including extension 43' and a flanged portion having an internal conical bevel 43" matching the other external conical surface of the resilient puck 21. The gear 43 is similarly journalled upon dual ball bearings 44 which are disposed with an aperture in support member 31. A collar or shaft clamp 42 retains the gear 43 in its relationship with the ball bearings 44 and the support member 31. The aperture along the axial length of the gear 43 permits the translation and rotation of the shaft 20, and the shaft 20 is retained within the axial aperture by a bushing 45. The gear teeth of the gear 43 are aligned to mesh with the gear teeth of a gear 46 of the second or low speed gear train 14. The gear 46 is mounted on a shaft 47 and is retained thereon by a shaft termination clamp 48. Adjustable knob load feel is provided by a friction means 50 disposed upon the shaft 47 and illustrated in FIG. 1C, which will be hereinafter described in greater detail. The shaft 47 is journalled in ball bearings 60, 61 disposed within apertures in support members 30, 31 respectively. A set of gear teeth 62 formed on shaft 47 meshes with a gear 63 on shaft 64 which is journalled in bear bearings 65, 66 in support members 30, 31 respectively. An anti-backlash or split gear 67 is disposed upon one end of the shaft 64 where it is retained thereon by shaft termination clamp 68. As stated above, gear 67 meshes with the gear 34 as indicated by the dotted line extending therebetween.

Figure 1A:
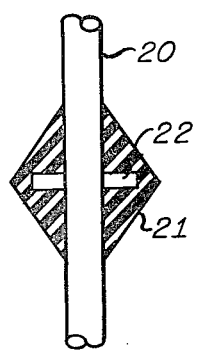
FIG. 1A is a partial sectional view of a resilient puck having adjoining and substantially conical surfaces moulded on a shaft.
Figure 1B:
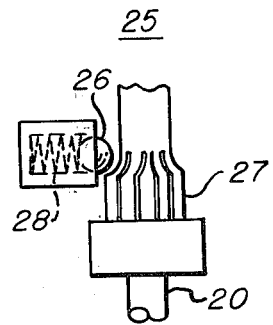
FIG. 1B is an illustration of a detent mechanism useful in the invention.

Referring now to FIG. 1A, an enlarged partial sectional view of the resilient puck 21 and shaft 20 assembly is provided. A cross pin 22 is inserted through an aperture in shaft 20, and a silicon rubber compound is moulded about the shaft pin to provide an axially resilient engaging surface with practically no rotational resiliency.

Referring now to FIG. 1B, a more detailed illustration of the detent mechanism 25 of FIG. 1 is provided. The detent mechanism 25 includes a ball 26 that is urged against an axially grooved collar 27 by a spring 28. When the gear changer 10 is set in its normal slew or course adjustment mode, the ball 26 does not contact the grooved collar 27 so that knob motion is smooth and uninterrupted. However, when the gear changer 10 is changed into the low speed or fine adjustment mode by displacing the shaft 20 inwardly, the ball 26 and grooved collar forces the shaft to a detent position. In one application the grooved collar 27 includes ten grooves such that when a thirty-six-to-one gear ratio is utilized, the detent arrangement will provide 360 positive discrete positions for one revolution of the synchro 17 and the resolver 6. Thus, the detent mechanism 25 will provide positive one degree incremental tactile positions so that the pilot may accurately and positively select precision headings and courses.

Figure 1C:
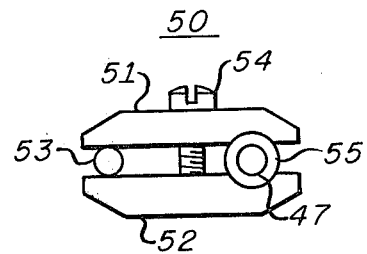
FIG. 1C is an illustration of friction means for providing an adjustable, positive feel load for the shaft.

Referring now to FIG. 1C, a more detailed illustration of the friction means 50 is provided. Since the detent mechanism 25 is not engaged during the course mode, the friction means 50 is utilized to provide a load feel for the pilot when adjusting the knob 19 in this mode and also to prevent any creep or movement of transducers 16, 17, should the gear changer 10 be subject to vibrations. Friction means 50 includes a pair of brake jaws 51, 52, and a fulcrum 53 and a load adjusting screw 54. A fiber bushing 55 is rigidly secured to the shaft 47 of FIG. 1. It should be noted, that the fulcrum 53 extends from the support frame 31 as also depicted in FIG. 1. Jaws 51, 52 are clamped on the fulcrum 53 and bushing 55 by means of screw 54 which then may be adjusted to maintain the desired degree of drag on the shaft 47, thereby eliminating any undesired creep or movement within the gear changer mechanism 10 when it is subject to vibrations and providing a tactile load for the knob 19.

The operation of the gear changer apparatus 10 of the present invention may now be fully appreciated. In the "normal" position or coarse adjustment mode, the conical surface of the resilient puck is urged against corresponding conical aperture 33" of the gear means 33 by spring 35 so that rotation of the knob 19 and shaft 20 rotates gear 33. Since gear 33 meshes with gear 34, rotation of the gear 33 imparts a rotation to the gear 34 and shaft 40 to transmit to the course selector resolver 16 and the course selector synchro 17 at the high speed gear ratio whereby the pilot may select large heading/course changes with relatively small knob rotation with the detent mechanism 25 not engaged. When the new selected course is approached or when small incremental changes in heading/course are desired, the pilot may press the knob 19 inwardly. The shaft 20 is displaced inwardly thus disengaging puck 21 from gear means 33, seating the ball 26 in a groove of collar 27 of the detent mechanism 25, and engaging the gear means 43. The adjoining conical surface of the resilient puck 21 now frictionally interfaces with the conical aperture 43" of the gear means 43, whereby gear 43 through low speed gear train 46, 62, 63, and 67 transmits knob motion to the resolvers 16 and synchro 17 via the common gear 18. It will now be appreciated that in accordance with the present invention, the transition between fine and coarse heading/course selection is achieved in a smooth and positive manner and without any possibility of introducing shift transients to the signal generators, and without any interruptions in the axial mount of the selector knob as is characteristic of the prior art mechanisms.

Although the present invention has been described in connection with its application in an automatic flight control system, it is to be understood that it is also applicable in other instrumentation requiring pilot operated fine/coarse data selection. For example, it is also applicable in panel mounted flight selection and display instrumentation such as altimeters, horizontal and vertical situation indicators and the like.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A gear changer for a rotatable data selector apparatus which comprises:

a base;

a selector member rotatably mounted on said base and translatable along an axis between selectable first and second positions;

clutching means responsive to the axial translation of said selector member, said clutching means including;

first and second substantially identical conical friction surfaces, which are axially disposed on said selector member; and first and second gears rotatably mounted on said base and along said axis, said first and second gears having an aperture through which extends said selector member and having axially disposed third and fourth conical friction surfaces, which respectively interface with said first and second conical friction surfaces in either said first or second selectable positions;

first gear train means responsive to the rotation of said selector member and said first gear for rotating at a first speed ratio;

second gear train means responsive to the rotation of said selector member and said second gear for rotating at a second speed ratio; and output means jointly responsive to said first and second gear train means.

2. An apparatus according to claim 1 wherein said first and second conical friction surfaces are defined by the exterior surfaces of symmetrical and oppositely disposed cones on said selector member and said third and fourth conical surfaces are defined by interior surfaces of symmetrical and oppositely disposed conical apertures in said first and second gears.

3. An apparatus according to claim 2 wherein said clutching means includes rotationally responsive detent means coupled with said selector members in at least one of its axial positions for providing incremental rotary movement of said selector.

4. An apparatus according to claim 3 wherein the gear train responsive to said selector member in the other of the axial positions includes means for imparting adjustable friction forces thereto.

5. An apparatus according to claim 4 which further includes spring means for biasing said selector member into either said first or second position.

* * * * *